United States Patent [19]
Barrie et al.

[11] Patent Number: 5,803,746
[45] Date of Patent: Sep. 8, 1998

[54] BODY PART MODEL AND METHOD OF MAKING SAME

[75] Inventors: Lorne K. Barrie; Leo J. Mahoney, both of Toronto, Canada

[73] Assignee: Medisim Corporation, Toronto, Canada

[21] Appl. No.: 589,921

[22] Filed: Jan. 23, 1996

[51] Int. Cl.[6] .......................... G09B 23/28; G09B 23/30; A61F 2/12
[52] U.S. Cl. ................. 434/267; 434/262; 623/8
[58] Field of Search ............. 623/7, 8; 434/267, 434/262, 272, 273

[56] References Cited

U.S. PATENT DOCUMENTS

| | | | |
|---|---|---|---|
| 4,075,782 | 2/1978 | Neuschatz | 46/118 |
| 4,737,109 | 4/1988 | Abramson. | |
| 4,867,686 | 9/1989 | Goldstein | 434/267 |
| 4,969,899 | 11/1990 | Cox | 623/8 |
| 5,133,753 | 7/1992 | Bark et al. | 623/8 |
| 5,146,933 | 9/1992 | Boyd | 128/899 |
| 5,273,435 | 12/1993 | Jacobson | 434/267 |

FOREIGN PATENT DOCUMENTS

| | | | |
|---|---|---|---|
| 2241815 | 9/1991 | United Kingdom | 434/267 |
| 2241815 | 11/1991 | United Kingdom . | |

*Primary Examiner*—Robert A. Hafer
*Assistant Examiner*—Laura Fossum
*Attorney, Agent, or Firm*—Rader, Fishman & Grauer PLLC

[57] ABSTRACT

A human part model is formed by spraying a layer of uncured silicone mixed with a catalyst and a solvent carrier onto the inside of a mould cavity. Next a model base is clamped to the mould and a body of uncured silicone gel mixed with a catalyst injected to fill the mould between the base and the layer. As the silicone layer cures, it adheres to the body of silicone gel, thereby enhancing the life-likeness of the resulting model. A breast cyst model may be formed by adding an elastomeric bulb to the base prior to clamping the base to the mould. The inlet of the bulb is inserted onto a passageway through the base, which passageway has a one-way valve to prevent backflow from the bulb. The hardness and thickness of the bulb is chosen so that it reseals after being needled.

11 Claims, 2 Drawing Sheets

BODY PART MODEL AND METHOD OF MAKING SAME

FIELD OF THE INVENTION

The present invention relates to a medical teaching aid for cyst location and aspiration and to a method of making a body part model.

BACKGROUND OF THE INVENTION

Clinical models of human body parts are finding increasing utility as training tools. An example of such a model is a breast palpation model which can be used for teaching doctors, residents and women how to conduct breast examinations to detect breast cancer. Breast cancer is one of the major diseases affecting women. Most breast cancers appear as a lump in the breast which can be detected using manual palpation. Traditionally in medical schools, this has been taught to health professionals (doctors and nurses) by hands on experience with actual patients in the hospital, clinic or office. However, with the availability of such women to serve as subjects for students decreasing, an alternative to using live patients is to use an artificial breast model. U.K. published patent application no. 2,241,815 describes an example breast palpation model. The model comprises a hard base covered with an skin-like envelope filled with silicone. The silicone contains soft rubber lumps. Additionally, a turntable on the base supports a moveable lump. While such models are of assistance, there utility would increase with improved life-like qualities. Furthermore, there is also a need for a breast model to teach the clinical skill of breast cyst aspiration.

Over half a million women in Canada and the United States visit their doctors annually with a lump in the breast which is a breast cyst (a collection of fluid within its own envelope in the breast tissue). Breast cysts are unique in that they can be proven immediately to be non-cancerous by a physician who can aspirate the cyst to remove the fluid. All that is required is a needle and syringe. Unfortunately, less than half of these lumps are treated in such an efficient and effective manner because the current approach to teaching students this skill is by doing so on an actual human patient. Most women are unwilling to become subjects for needling practice by an inexperienced student. Due to this problem, training in this skill is generally confined to specialists. Consequently, the primary contact physician is seldom confident in his or her ability to perform a needle aspiration and therefore has to refer the patient to a specialist. The resultant delay in diagnosis, increased expense, and stress on the anxious woman could all be avoided if there were a good model with which to teach the skill. A good cyst aspiration model could also be adapted for use in simulating cysts in other human or animal body parts.

SUMMARY OF THE INVENTION

According to the present invention, there is provided a medical teaching aid for cyst location and aspiration, comprising: a base an elastomeric bulb fabricated of an elastomer of a hardness and thickness sufficient to reseal after puncture by a needle, a resilient body covering said base and said elastomeric bulb; a passageway extending from an exteriorly accessible inlet to an inlet of said bulb; means to impede fluid flow through said passageway at least in a one-way direction from said bulb.

BRIEF DESCRIPTION OF THE DRAWINGS

In the figures which illustrate an example embodiment of this invention.

DETAILED DESCRIPTION OF THE PREFERRED EMBODIMENTS

Figure 1:
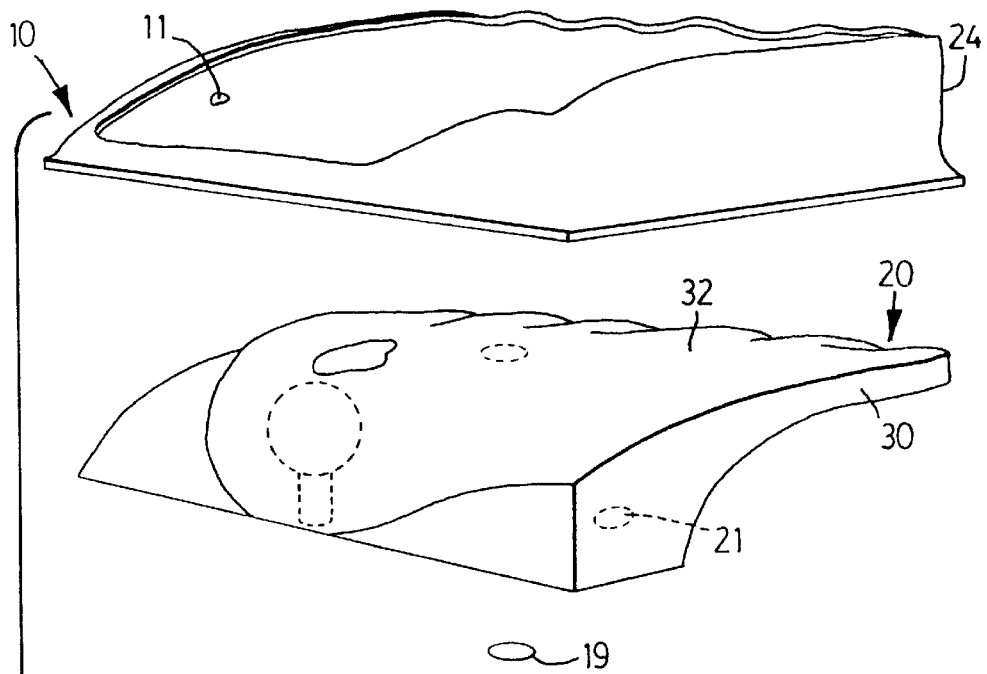
FIG. 1 is a perspective exploded view a breast cyst aspiration model made in accordance with the present invention.
Figure 1:
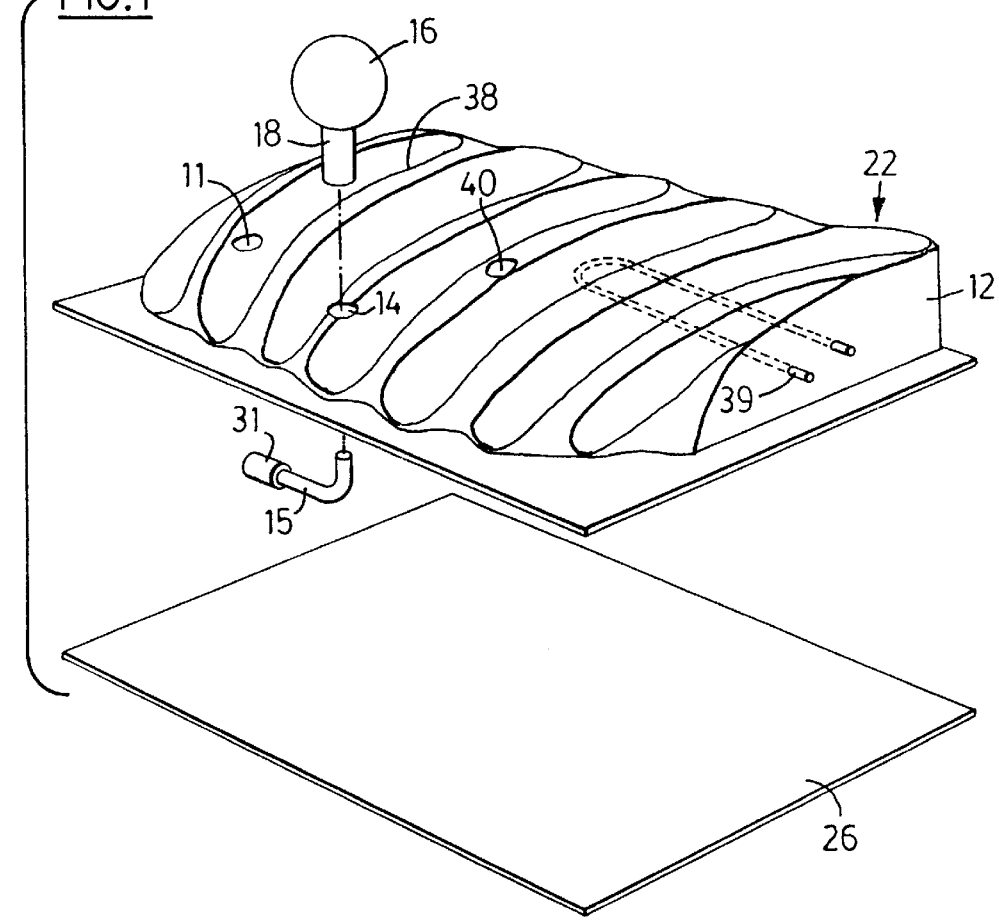
Figure 2:
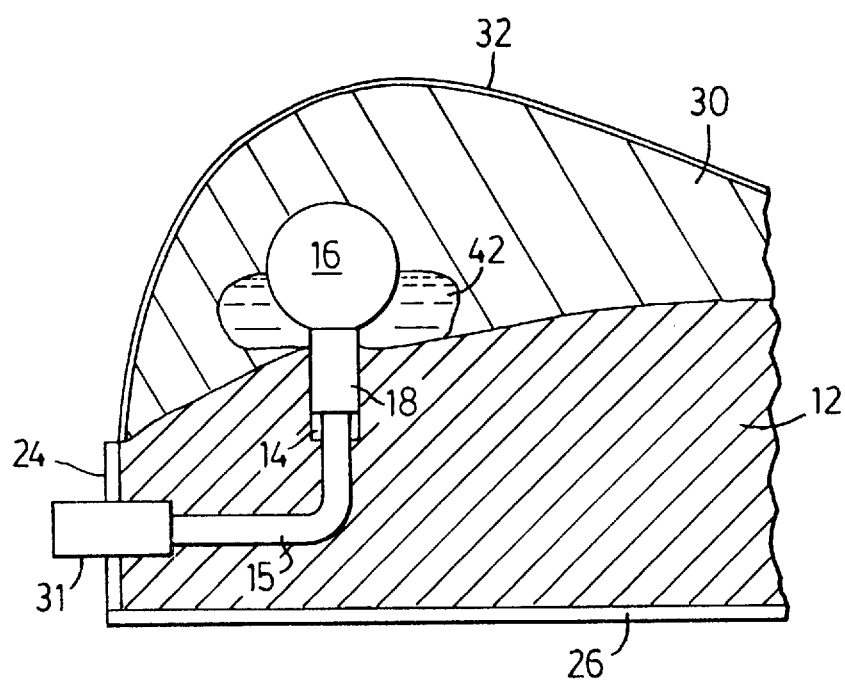
FIG. 2 is a side sectional view of the model of FIG. 1.

Turning to FIGS. 1 and 2, a breast cyst location and aspiration model indicated generally at 10 comprises a rigid and semi-rigid base 12 simulating ribs 38 and soft tissue of the chest wall. A passageway 14 extends through the base from one end of the base 11. The passageway contains a fine plastic tube 15 which extends from a one-way valve 31 to an elastomeric bulb 16. The inlet 18 of the bulb 16 is connected to the tube 15 so that the bulb is in fluid communication with the passageway and extends upwardly from the upper surface 22 of the base 12. One or more lumps 19 and 21 rest on the upper surface of the base. A resilient body 20 (simulating breast tissue) covers the upper surface 22 of the base 12 and the elastomeric bulb 16. A number of lumps 19 and 21 may be dispersed at varying positions and depth in the body 20. The thickness of the body 20 varies from ½" to 2", with the bulb 16 preferably located in the thickest area of the body. An outer shell 24 surrounds the sides of the resilient body and a plate 26 is glued to the back of the base. The one-way valve 31 prevents backflow through the tube 15 from the bulb 16.

The resilient body 20 comprises a body 30 (FIG. 2) of silicone gel covered by an elastomeric skin 32, which is preferably a silicone elastomer. Base 12 incorporates a resistance heater 39. As seen in FIG. 2, a fluid deposit 42 surrounds the lower portion of bulb 16.

Prior to use of model 10, a source of electricity is coupled to resistance heater 39 in order to heat the resilient body 20 and thereby increase its realism. Also, bulb 16 is filled with a liquid by way of tube 15 in passageway 14. As will be explained more fully hereafter, with bulb 16 filled, the fluid deposit 42 displaces the gel body 30 from its rest position such that the gel body is compressed and exerts a reaction force on the fluid deposit and, therefore, the bulb.

In use of model 10 (FIG. 1), a student may palpate the model to locate the various lumps. Once the elastomeric bulb 16 has been located by the student, and the student suspects that this bulb is in the nature of a cyst, the student may attempt to aspirate the bulb with a needle and syringe. By aspiration, the bulb can be emptied completely and made to disappear in exactly the same way as in the actual treatment of a patient. In this regard, as liquid is withdrawn from the bulb, it begins to collapse. The fluid deposit 42 (FIG. 2), under the urging of the gel body 30, flows over the collapsed area of the bulb. With the bulb completely collapsed, the gel body returns to its rest position and the fluid deposit occupies the volume occupied by the bulb before aspiration.

After aspiration, the bulb may be refilled through passageway 14 and the cyst reconstituted. The hardness and thickness of the elastomer of which the bulb is formed is chosen so that the bulb will not leak liquid after being refilled with liquid. Therefore, the process may be repeated hundreds of times. The fluid deposit 42 is confined to the lower portion of the bulb 16 so that it will not be aspirated in an attempt to aspirate the bulb.

The model can be used to give doctors at all stages of their training effective experience in learning the skill of cyst aspiration. It also provides a very reliable tool for evaluating a student's proficiency in performing this skill at the end of their training period.

The model 10 may be manufactured in the following, fashion. The base may be vacuum formed, cast, or extruded with the passageway 14 defined by a sleeve and resistance heater 39 in place. The lumps 19, 21 and the elastomeric bulb 16 may be made in separate moulds. In this regard, the bulb 16 comprises a silicone elastomer with a hardness (durometer) and thickness selected so as to allow the bulb to reseal after being needled. The elastomeric skin 32 is prepared by mixing a two part uncured silicone, such as a polyvinyldimethylsiloxane, in a solvent carrier which allows the material to be sprayed through an air gun. A preferred carrier is methylene dichloride, though others may be used. A non-functional silicone fluid is added in amounts sufficient to create a gel with a durometer of approximately 3 shore A. A preferred silicone fluid is polydimethylsiloxane, vinyldimethyl terminated. Finally, catalyst is added in an amount sufficient to cure the silicone mixture. A preferred catalyst is a platinum/vinyl siloxane catalyst such as a platinum-divinyltetramethyldisiloxane catalyst. The amount of catalyst added depends on the time desired for curing the polymer. The rate of catalyzation can be controlled from less than one minute to approximately twenty-four hours at room temperature without the addition of heat.

The skin material is then placed in spray equipment and a layer of appropriate thickness relative to desired model is sprayed onto the surface of the cavity of a mould shaped like a human breast. Pigment is then brushed into the nipple and areola area. Next an injection passageway 40 is drilled through base 12. Then passageway 14 is drilled in the base and one-way valve 31, tube 15, and bulb 16 are fitted into the passageway 14 so that the inlet 18 of the bulb is received within the end of the passageway with one-way valve 31 exiting base 12 at 11. The bulb is then filled with liquid. Any lumps 19 and 21 are held in position over the upper surface 22 of base 12 by retaining screws which screw through the back of the base. The mould cavity is then closed by clamping the base to the mould. Silicone gel is then mixed to the desired softness and colour and a curing catalyst is added to the gel. The gel is then injected into the mould cavity through the injection passageway 40 so as to form a body of silicone gel filling the mould between the base 12 and the skin layer 32. The skin layer 32 and the body of gel 30 are then allowed time to cure. Because the skin layer is of a compatible material to that of the gel body, it may cure before, during, or after injection of the silicone gel and will adhere to the body of silicone gel. After the skin and body of gel have cured, the model may be removed from the mould, the retaining screws may be removed from the lumps 19 and 21 and the outer shell 24 may be fitted over the sides of the base 12 and the edges of the body of silicone gel and skin 32 and glued in place. Next, the back plate 26 may be glued in place. Lastly, a fluid, such as water, may be injected into the gel body 30 at bulb 16. Since the gel body has cured, it has a memory for its rest position. This fluid will displace the gel body from this rest position in forming a fluid deposit 42 (FIG. 2) about the bulb. Consequently, the gel body will exert a restorative force against the fluid deposit.

The value of teaching the skill of cyst aspiration is not confined to the treatment of breast disease. Cysts, other than breast cysts, occur in other areas of the human body as well as many other mammals such as dogs, cats, farm animals, etc. A model of a different body part may be made by the described method to accommodate different teaching uses.

The method of creating a skin layer with an attached underlayer of silicone gel also has application to other non-cyst teaching models since it provides a model with enhanced life-like qualities.

Figure 2A:
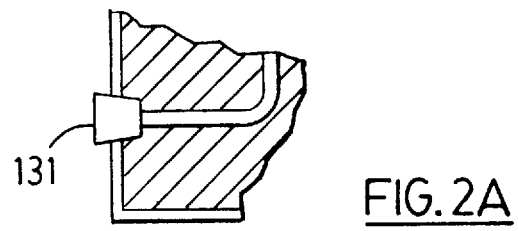
FIG. 2A is a fragmentary side sectional view of a modified form of a model made in accordance with another aspect of this invention.

It will be apparent that the skin layer may be applied to the cavity of a mould by other means than spraying, such as brushing on this layer. Referencing FIG. 2A, one-way valve 31 could be replaced by a plug 131 which would be pierced by needle and syringe only while filling bulb 16 with liquid. The fluid of fluid deposit 42 may be air rather than water.

Other modifications will be apparent to those skilled in the art and, therefore, the invention is defined in the claims.

What is claimed is:

1. A medical teaching aid for cyst location and aspiration, comprising:

a base;

an elastomeric bulb fabricated of an elastomer of a hardness and thickness sufficient to reseal after puncture by a needle,;

a resilient body covering said base and said elastomeric bulb;

a passageway extending from an exteriorly accessible inlet through said base to an inlet of said bulb;

means to impede fluid flow through said passageway at least in a one-way direction out of said bulb.

2. The teaching aid of claim 1 wherein said means to impede fluid flow comprises a one-way valve in said passageway.

3. The teaching aid of claim 1 including a deposit of fluid located exteriorly of said bulb and adjacent to said bulb.

4. The teaching aid of claim 3 wherein said resilient body comprises a body of cured silicone gel and an elastomeric skin.

5. The teaching aid of claim 4 including a heater to heat said resilient body.

6. The teaching aid of claim 5 wherein said base has a face, said face being covered by said resilient body, said face having a ribbed surface.

7. The teaching aid of claim 6 including at least one lump within said body of cured silicone gel.

8. The teaching aid of claim 7 wherein said resilient body is shaped in the form of a human breast.

9. The teaching aid of claim 1 wherein said means to impede fluid flow comprises a removable plug in said exteriorly accessible inlet of said passageway.

10. A medical teaching aid for cyst location and aspiration, comprising:

a rigid base having a passageway extending therethrough;

an elastomeric bulb fabricated of an elastomer of a hardness and thickness sufficient to reseal after puncture by a needle, said bulb having an inlet in fluid communication with said passageway;

a body of silicone gel covering said bulb and covering said base;

an elastomeric skin covering said body of silicone gel; and one of a one-way valve and a removable plug associated with said passageway to impede fluid back flow from said bulb.

11. The teaching aid of claim 10 including a deposit of fluid located exteriorly of said bulb and adjacent to said bulb.

\* \* \* \* \*